United States Patent
Rhee et al.

(10) Patent No.: US 10,770,767 B2
(45) Date of Patent: Sep. 8, 2020

(54) LITHIUM-AIR BATTERY SYSTEM USING VORTEX TUBE

(71) Applicants: Hyundai Motor Company, Seoul (KR); Kia Motors Corporation, Seoul (KR)

(72) Inventors: Jun Ki Rhee, Gyeonggi-Do (KR); Yoon Ji Lee, Gyeonggi-do (KR); In Woo Song, Gyeonggi-Do (KR); Se Young Lee, Seoul (KR); Min Soo Kim, Seoul (KR); Dong Kyu Shin, Seoul (KR); Dong Gyun Kang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 123 days.

(21) Appl. No.: 16/055,111

(22) Filed: Aug. 5, 2018

(65) Prior Publication Data
US 2019/0181519 A1    Jun. 13, 2019

(30) Foreign Application Priority Data
Dec. 13, 2017 (KR) .......... 10-2017-0171114

(51) Int. Cl.
| | |
|---|---|
| H01M 12/06 | (2006.01) |
| H01M 6/02 | (2006.01) |
| H01M 6/50 | (2006.01) |
| H01M 10/6561 | (2014.01) |
| H01M 10/613 | (2014.01) |
| H01M 10/615 | (2014.01) |
| H01M 12/08 | (2006.01) |

(52) U.S. Cl.
CPC ............ *H01M 12/06* (2013.01); *H01M 6/02* (2013.01); *H01M 6/5038* (2013.01); *H01M 10/613* (2015.04); *H01M 10/615* (2015.04); *H01M 10/6561* (2015.04); *H01M 12/08* (2013.01)

(58) Field of Classification Search
CPC ..................... H01M 10/615; H01M 10/613
See application file for complete search history.

(56) References Cited

U.S. PATENT DOCUMENTS

| | | | |
|---|---|---|---|
| 2013/0119937 A1* | 5/2013 | Arseneault | H01M 10/6564 320/130 |
| 2015/0295285 A1* | 10/2015 | Takeuchi | B60L 3/0023 62/498 |

(Continued)

FOREIGN PATENT DOCUMENTS

KR    20130079763 A  *  7/2013

OTHER PUBLICATIONS

Machine translation of KR 2013-0079763 (no date).*

*Primary Examiner* — Amanda C. Walke
(74) *Attorney, Agent, or Firm* — Mintz Levin Cohn Ferris Glovsky and Popeo, P.C.; Peter F. Corless

(57) ABSTRACT

A lithium-air battery system using a vortex tube is provided, in which the vortex tube is connected to an oxygen supply port of a lithium-air battery having a stack form. A high-temperature gas generated in the vortex tube is supplied to the lithium-air battery to induce a stimulating reaction and simultaneously, a low-temperature gas generated in the vortex tube is supplied to a cooling path in the lithium-air battery to realize efficient cooling of the lithium-air battery.

7 Claims, 2 Drawing Sheets

(56) References Cited

U.S. PATENT DOCUMENTS

| | | | |
|---|---|---|---|
| 2016/0204487 A1* | 7/2016 | Morioka | H01M 10/6563 |
| | | | 429/50 |
| 2019/0140235 A1* | 5/2019 | Lindstrom | H01M 2/12 |
| 2019/0198954 A1* | 6/2019 | Miura | B60K 11/02 |
| 2019/0267687 A1* | 8/2019 | Suzuki | H01M 4/483 |

* cited by examiner

LITHIUM-AIR BATTERY SYSTEM USING VORTEX TUBE

CROSS-REFERENCE TO RELATED APPLICATION

This application claims under 35 U.S.C. § 119(a) the benefit of priority to Korean Patent Application No. 10-2017-0171114 filed on Dec. 13, 2017, the entire contents of which are incorporated herein by reference.

BACKGROUND

(a) Technical Field

The present disclosure relates to a lithium-air battery system using a vortex tube, and more particularly, to a lithium-air battery system using a vortex tube, in which a high-temperature gas for a stimulating reaction or a low-temperature gas for cooling may be supplied to a lithium-air battery using the vortex tube.

(b) Background Art

A lithium-air battery system is a type of secondary battery that produces electricity via a reaction of oxygen and lithium. It is necessary to maintain an appropriate temperature of oxygen to be supplied to a lithium-air battery for efficient operation of the entire system, and to effectively control the dissipation of heat generated in the lithium-air battery for the stability of the entire system.

In a general lithium-air battery system, since oxygen is supplied from an oxygen bomb to a lithium-air battery without undergoing a particular temperature regulation, the temperature of the lithium-air battery is regulated using a cooling device, which is provided separately from the lithium-air battery. However, when the cooling device having a cooling path is mounted to the lithium-air battery, the lithium-air battery may be increased in volume, and may require greater energy for operating the cooling device. In addition, when the cooling device is not operated under predetermined operating conditions, the efficiency of a chemical reaction in the lithium-air battery may deteriorate.

SUMMARY

The present disclosure provides a lithium-air battery system using a vortex tube, in which the vortex tube is connected to a gas supply port of a lithium-air battery having a stack form to supply a high-temperature gas generated in the vortex tube to the lithium-air battery to thus induce a stimulating reaction and simultaneously, a low-temperature gas generated in the vortex tube is supplied to a cooling path in the lithium-air battery to realize efficient cooling of the lithium-air battery.

In one aspect, a lithium-air battery system using a vortex tube may include a lithium-air battery, a gas supply device configured to supply a reaction gas for electricity production to the lithium-air battery, and the vortex tube disposed between the lithium-air battery and the gas supply device to divide the gas, supplied from the gas supply device, into a high-temperature gas and a low-temperature gas, wherein the high-temperature gas, produced in the vortex tube, is supplied to the lithium-air battery, and simultaneously, the low-temperature gas is supplied to a cooling path in the lithium-air battery.

In an exemplary embodiment, the vortex tube may include a compressed-air supply port and a low-temperature gas discharge port formed in a main body thereof, which may be respectively connected to the gas supply device and a cooling path inlet of the lithium-air battery. The vortex tube may further include a high-temperature gas discharge port formed in a vortex circulation tube thereof, which is connected to a gas inlet of the lithium-air battery.

In another exemplary embodiment, the gas supply device may include a gas storage tank and a regulator mounted on an outlet side of the gas storage tank to regulate a gas discharge pressure to a constant value. The lithium-air battery system may further include a first 3-way valve disposed between the gas supply device and a compressed-air supply port formed in a main body of the vortex tube, and a second 3-way valve disposed on a side of a gas outlet and a cooling path outlet of the lithium-air battery.

In addition, the lithium-air battery system may include a recirculation line connected between the first 3-way valve and the second 3-way valve to recirculate a gas discharged from the lithium-air battery to the vortex tube. The recirculation line may include a blower configured to blow the recirculating gas to the first 3-way valve, and the recirculation line may also be disposed on a distal end portion thereof with a check valve to prevent backflow of the gas moving to the first 3-way valve.

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not limitative of the present disclosure, and wherein.

Figure 1:
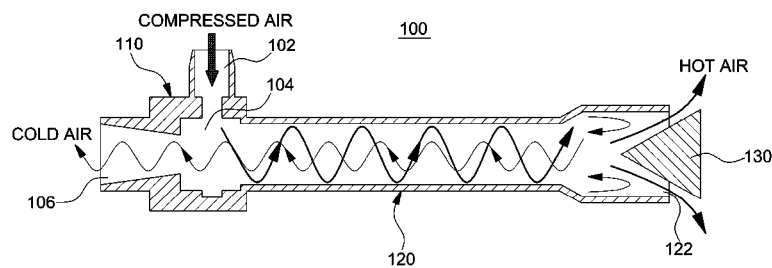
FIG. 1 is a cross-sectional view illustrating the structure and the operational state of a vortex tube according to an exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings to allow those skilled in the art to easily practice the exemplary embodiments. First, to assist the understanding of the present disclosure, the structure and the operating principle of a vortex tube will be described below.

FIG. 1 illustrates the structure and the operational state of a vortex tube. The vortex tube, designated by reference numeral 100, serves to divide a vortex gas that rotates at a high speed into a high-temperature gas and low-temperature gas using a spontaneous energy separation phenomenon. The vortex tube 100 may include a main body 110 having a vortex generation chamber 104, a vortex circulation tube 120 connected to a first side of the main body 110 to communicate with the vortex generation chamber 104, and a regulation valve 130 mounted to a distal end portion of the vortex circulation tube 120 to regulate the size of a high-temperature gas discharge port 122.

In addition, a compressed-gas supply port 102 may be formed in a top portion of the main body 110 to supply a compressed gas to the vortex generation chamber 104, and a low-temperature gas discharge port 106 may be formed in a second side of the main body 110. Accordingly, when high-pressure compressed gas is supplied to the vortex generation chamber 104 through the compressed-gas supply port 102, the gas collides with the wall surface of the vortex generation chamber 104 and is perpendicularly sprayed to the vortex circulation chamber 120.

Subsequently, the gas G1, sprayed to the vortex circulation tube 120, has spiral rotating energy, like a whirlwind, and thus may move to the distal end portion of the vortex circulation tube 120. In addition, the spiral rotating energy of the gas G1, which spirally rotates and moves to the distal end portion of the vortex circulation tube 120, may be changed to thermal energy due to the loss of viscosity, thus causing an increase in the gas G1 temperature.

When the regulation valve 130, mounted to the distal end portion of the vortex circulation tube 120, is opened at a predetermined degree, a portion of the air, which has been increased in temperature by the changed thermal energy, may be discharged through the high-temperature gas discharge port 122. Simultaneously, the remaining gas, not discharged through the high-temperature gas discharge port 122, may be reversed in direction and spirally rotate and flow back along a central portion of the vortex circulation tube 120.

Additionally, the gas G2, which spirally rotates and flows back along the central portion of the vortex circulation tube 120, and the gas G1, which surrounds the backflow gas G2 and spirally rotates and moves to the distal end portion of the vortex circulation tube 120, are at about the same temperature. However, the spiral rotating speed of the gas G2, which spirally rotates and flows back along the central portion of the vortex circulation tube 120, is less than that of the gas G1. Therefore, the total enthalpy of the gas G2 is less than that of the gas G1, which spirally rotates and moves to the distal end portion of the vortex circulation tube 120. Accordingly, the gas G2, which spirally rotates and flows back along the central portion of the vortex circulation tube 120, gradually loses heat and may be cooled, thereby entering a low-temperature gas state, and thereafter, may be discharged through the low-temperature gas discharge port 106.

Accordingly, through the use of the vortex tube with the above-described configuration, high-temperature gas may be supplied to a lithium-air battery to induce a stimulating reaction, and simultaneously, low-temperature gas may be supplied to the lithium-air battery to realize efficient cooling of the lithium-air battery.

Figure 2:
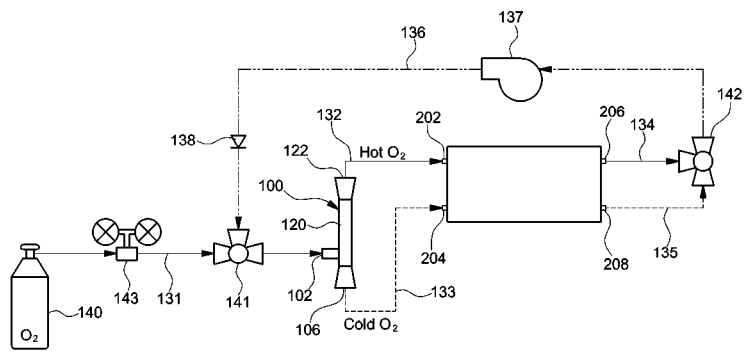
FIG. 2 is a view illustrating the configuration of a lithium-air battery system using a vortex tube according to an exemplary embodiment of the present disclosure.

FIG. 2 illustrates a lithium-air battery system using the vortex tube according to an exemplary embodiment of the present disclosure. As illustrated in FIG. 2, the lithium-air battery system using the vortex-tube may include a lithium-air battery 200, a gas supply device configured to supply a reaction gas for electricity production to the lithium-air battery 200, and the vortex tube 100 disposed between the lithium-air battery 200 and the gas supply device to divide the gas supplied from the gas supply device into a high-temperature gas and a low-temperature gas.

Through the configuration described above, the high-temperature gas, produced in the vortex tube 100, may be supplied to a positive electrode in the lithium-air battery 200, and simultaneously, the low-temperature gas may be supplied to a cooling path in the lithium-air battery 200. Accordingly, the vortex tube 100 may be connected to the lithium-air battery 200, which includes battery cells in a stack form, to supply a gas (e.g., oxygen or air) thereto.

Particularly, in the configuration of the vortex tube 100, the gas supply device configured to supply a high-pressure compressed gas, may be connected to the compressed-gas supply port 102 formed in the top portion of the main body 110 via a first pipeline 131, the low-temperature gas discharge port 106 of the main body 110 may be connected to a cooling path inlet 204 of the lithium-air battery 200 via a third pipeline 133, and the high-temperature gas discharge port 122 of the vortex circulation tube 120 may be connected to a gas inlet 202 of the lithium-air battery 200 via a second pipeline 132.

In addition, a second 3-way valve 142 may be connected to a fourth pipeline 134 and a fifth pipeline 135, which are respectively connected to a gas outlet 206 and a cooling path outlet 208 of the lithium-air battery 200. Particularly, the gas supply device may include a gas storage tank 140 in which a gas such as oxygen or air may be stored and a regulator 143, mounted at the outlet side of the gas storage tank 140 to regulate a gas discharge pressure to a constant value. Alternatively, the gas supply device may be, for example, an outside-air supply device such as a compressor, capable of compressing and supplying outside air.

Further, a first 3-way valve 141 may be connected to the first pipeline 131 connected to the regulator 143 and to the compressed-gas supply port 102 of the main body 110. In addition, a recirculation line 136 may connect the first 3-way valve 141 to the second 3-way valve 142 to recirculate the gas, discharged from the lithium-air battery 200, to the vortex tube 100 via the first pipeline 131. A blower 137 may be mounted on the recirculation line 136 to blow the recirculating gas to the first 3-way valve 141. A check valve 138 may be mounted on the recirculation line 136 to prevent backflow of the gas, which flows to the first 3-way valve 141 along the recirculation line 136.

Figure 3:
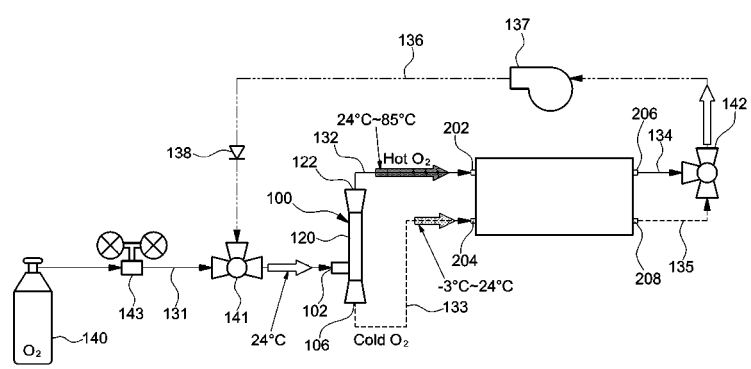
FIG. 3 is a view illustrating the operational state of the lithium-air battery system using the vortex tube according to an exemplary embodiment of the present disclosure.

FIG. 3 illustrates an operation of the lithium-air battery system using the vortex tube according to the present disclosure. First, after a gas (e.g., oxygen) is discharged from the high-pressure gas storage tank 140 (having, for example, a pressure of about 100 bar or greater), the gas may be depressurized to a low pressure (e.g., ranging from about 2 bar to 5 bar) in the regulator 143. Subsequently, the gas depressurized in the regulator 143 may pass through the first 3-way valve 141 and move to the vortex tube 100.

In particular, the gas, moved to the vortex tube 100, may be supplied to the vortex generation chamber 104 through the compressed-gas supply port 102 of the main body 110, and thereafter, may be divided into a high-temperature gas (oxygen) and a low-temperature gas (oxygen), as described above. Meanwhile, the temperature of the low-temperature gas separated in the vortex tube 100 (e.g., the temperature of the low-temperature oxygen or air) may be regulated by the pressure of the gas that is initially supplied to the vortex tube 100.

In other words, the maximum temperature-reduction range of the gas separated in the vortex tube 100 is proportional to the pressure of the gas that is initially supplied to the vortex tube 100. For example, when the pressure of the gas (e.g., oxygen or air) that is initially supplied to the vortex tube 100 is about 2 bar, the low-temperature gas separated in the vortex tube 100 may be reduced in temperature by about 17° C., compared to the initial supply temperature thereof. In addition, when the pressure of the gas (e.g., oxygen or air) that is initially supplied to the vortex tube 100 is about 3 bar, the low-temperature gas separated in the vortex tube 100 may be reduced in temperature by about 27° C., compared to the initial supply temperature thereof.

Therefore, assuming that the pressure of the gas that is initially supplied to the vortex tube 100 is about 3 bar, when the temperature of the gas in the gas storage tank 140 is about 24° C., the temperature of the low-temperature gas separated in the vortex tube 100 is about −3° C. and the temperature of the high-temperature gas is about 34° C. In addition, by regulating the pressure and the flow rate of the gas to be supplied to the vortex tube 100, the temperature of the low-temperature gas may be regulated to a range from about −3° C. to about 24° C., and the temperature of the high-temperature gas may be regulated to a range from about 24° C. to about 85° C.

Accordingly, after the gas supplied to the vortex tube 100 is divided into the high-temperature gas (oxygen or air) and the low-temperature gas (oxygen or air), the high-temperature gas may be discharged through the high-temperature gas discharge port 122, pass through the gas inlet 202 of the lithium-air battery 200, and may be supplied to the positive electrode (not illustrated) in the lithium-air battery 200, thereby undergoing a reaction for electricity production.

By using the high-temperature gas in the electricity production reaction in the lithium-air battery 200, it may be possible to further stimulate an electro-chemical reaction, and thus to increase the charging capacity of the lithium-air battery. Additionally, after the gas supplied to the vortex tube 100 is divided into the high-temperature gas and the low-temperature gas, the low-temperature gas may be discharged through the low-temperature gas discharge port 106, pass through the cooling path inlet 204 of the lithium-air battery 200, and may be supplied to the cooling path (not illustrated) in the lithium-air battery 200, thereby removing heat generated in the electricity production reaction of the lithium-air battery 200.

By cooling the lithium-air battery 200 using the low-temperature gas produced in the vortex tube 100, it may be possible to eliminate a cooling device that has conventionally been mounted to a lithium-air battery, or to reduce the load of the cooling device. In addition, it may be possible to reduce the power consumption of the cooling device that has conventionally been mounted to a lithium-air battery, and to reduce the scale of equipment required for the cooling device.

When cooling for the lithium-air battery 200 is unnecessary, the low-temperature gas may be bypassed to the discharge side of the lithium-air battery 200 and mixed with the discharged gas that has undergone the reaction, and thus, an electrolyte contained in the discharged gas may be condensed, which may reduce the loss of the electrolyte. Subsequently, the high-temperature gas that has undergone the reaction, and the low-temperature gas that has undergone the cooling, may be discharged from the lithium-air battery 200 through the gas outlet 206 and the cooling path outlet 208, and then may be joined in the second 3-way valve 142, and thereafter recirculated to the first 3-way valve 141 along the recirculation line 136. Accordingly, the gas recirculated to the first 3-way valve 141 may be recirculated to the vortex tube 100.

As is apparent from the above description, the present disclosure provides the following effects.

First, by supplying high-temperature oxygen, which has passed through a vortex tube, to a positive electrode in a lithium-air battery, it may be possible to induce a stimulating electricity production reaction in the lithium-air battery.

Second, by supplying low-temperature oxygen, which has passed through the vortex tube, to a cooling path in the lithium-air battery, it may be possible to more easily cool the lithium-ion battery in real time.

Third, since high-pressure oxygen may be divided into high-temperature and low-pressure oxygen and low-temperature and low-pressure oxygen and supplied to the lithium-air battery using the vortex tube without separate power, it may be possible to increase the efficiency of operation for electricity production and the efficiency of cooling of an entire lithium-air battery system.

Fourth, it may be possible to eliminate a cooling system that has conventionally been mounted to a lithium-air battery or to reduce the load of the cooling system, which is advantageous in terms of costs.

The disclosure has been described in detail with reference to exemplary embodiments thereof. However, it will be appreciated by those skilled in the art that the present disclosure may be implemented in various modifications and alterations via, for example, addition, change or omission of constituent elements without departing from the principles and spirit of the disclosure, and these modifications and alterations are included in the scope of the present disclosure.

In addition, in the description of the exemplary embodiments of the present disclosure, a detailed description of known functions and configurations incorporated herein is omitted when it may make the subject matter of the present disclosure rather unclear. In addition, the terms used in the above description are defined in consideration of the functions in the exemplary embodiments of the present disclosure, and may be replaced by other terms based on intensions of users or operators, customs, or the like. Hence, the meanings of these terms should be based on the whole content of this specification. Accordingly, the above detailed description of the present disclosure is not intended to limit the present disclosure by the disclosed exemplary embodiments, and the accompanying claims should be construed as including other exemplary embodiments.

What is claimed is:

1. A lithium-air battery system using a vortex tube, comprising:
    a lithium-air battery;
    a gas supply device configured to supply a reaction gas for electricity production to the lithium-air battery;
    the vortex tube disposed between the lithium-air battery and the gas supply device to divide the gas, supplied from the gas supply device, into a high-temperature gas and a low-temperature gas;
    a first 3-way valve disposed between the gas supply device and a compressed-air supply port formed in a main body of the vortex tube; and
    a second 3-way valve disposed on a side of a gas outlet and a cooling path outlet of the lithium-air battery,
    wherein the high-temperature gas, produced in the vortex tube, is supplied to the lithium-air battery, and simultaneously, the low-temperature gas is supplied to a cooling path in the lithium-air battery.

2. The system of claim 1, wherein the vortex tube includes:
    a compressed-air supply port and a low-temperature gas discharge port formed in a main body thereof, which are respectively connected to the gas supply device and a cooling path inlet of the lithium-air battery; and
    a high-temperature gas discharge port formed in a vortex circulation tube thereof, which is connected to a gas inlet of the lithium-air battery.

3. The system of claim 1, wherein the gas supply device includes a gas storage tank and a regulator mounted on an outlet side of the gas storage tank to regulate a gas discharge pressure to a constant value.

4. The system of claim 1, wherein the gas supply device includes a compressor configured to compress and supply outside air.

5. The system of claim 1, further comprising:
    a recirculation line connected between the first 3-way valve and the second 3-way valve to recirculate a gas discharged from the lithium-air battery to the vortex tube.

6. The system of claim 5, wherein the recirculation line includes a blower configured to blow the recirculating gas to the first 3-way valve.

7. The system of claim 5, wherein the recirculation line is disposed on a distal end portion thereof with a check valve to prevent backflow of the gas moving to the first 3-way valve.

* * * * *